United States Patent
Takeda et al.

(10) Patent No.: US 10,914,375 B2
(45) Date of Patent: Feb. 9, 2021

(54) CONTROL DEVICE OF VEHICLE

(71) Applicant: TOYOTA JIDOSHA KABUSHIKI KAISHA, Toyota (JP)

(72) Inventors: Hiroki Takeda, Okazaki (JP); Kyohei Suzumura, Nagoya (JP); Yoshisuke Kametani, Nagoya (JP); Kenji Matsuo, Toyota (JP); Satoshi Kamijo, Toyota (JP); Michio Yoshida, Susono (JP); Toshio Suzuki, Toyota (JP); Makoto Sawada, Nisshin (JP); Takashi Seo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 16/291,507

(22) Filed: Mar. 4, 2019

(65) Prior Publication Data
US 2019/0271391 A1 Sep. 5, 2019

(30) Foreign Application Priority Data
Mar. 2, 2018 (JP) .................. 2018-038000

(51) Int. Cl.
*F16H 61/04* (2006.01)
*F16H 59/44* (2006.01)
*F16H 37/08* (2006.01)
*F16H 61/66* (2006.01)
*F16H 61/662* (2006.01)

(52) U.S. Cl.
CPC ......... *F16H 61/04* (2013.01); *F16H 37/0846* (2013.01); *F16H 59/44* (2013.01); *F16H 61/66* (2013.01); *F16H 61/662* (2013.01); *F16H 2037/0873* (2013.01); *F16H 2061/0474* (2013.01); *F16H 2061/6609* (2013.01)

(58) Field of Classification Search
CPC .. F16H 59/44; F16H 59/46; F16H 2061/6609; F16H 2061/0474; F16H 61/66; F16H 61/662
See application file for complete search history.

(56) References Cited

U.S. PATENT DOCUMENTS 9,334,953 B2 * 5/2016 Kurata ................... F16D 48/06
10,539,229 B2 * 1/2020 Inoue .................... F16H 61/702
2016/0091090 A1 3/2016 Kimura et al.

FOREIGN PATENT DOCUMENTS

| JP | 2010-185466 A | 8/2010 |
| JP | 2015-105708 A | 6/2015 |
| WO | 2014/170959 A1 | 10/2014 |

* cited by examiner

*Primary Examiner* — Erin D Bishop
(74) *Attorney, Agent, or Firm* — Oliff PLC

(57) ABSTRACT

In a control device of a vehicle including a first power transmission path transmitting a power through a belt-type continuously variable transmission and a second power transmission path transmitting a power through a reduction gear mechanism in parallel between an input shaft and an output shaft and including a dog clutch in series with the reduction gear mechanism in the second power transmission path, when the dog clutch is in an engagement transition state and a rotational speed change of the output shaft is equal to or greater than a predetermined value, the engagement transition state of the dog clutch is canceled to release the dog clutch.

7 Claims, 9 Drawing Sheets

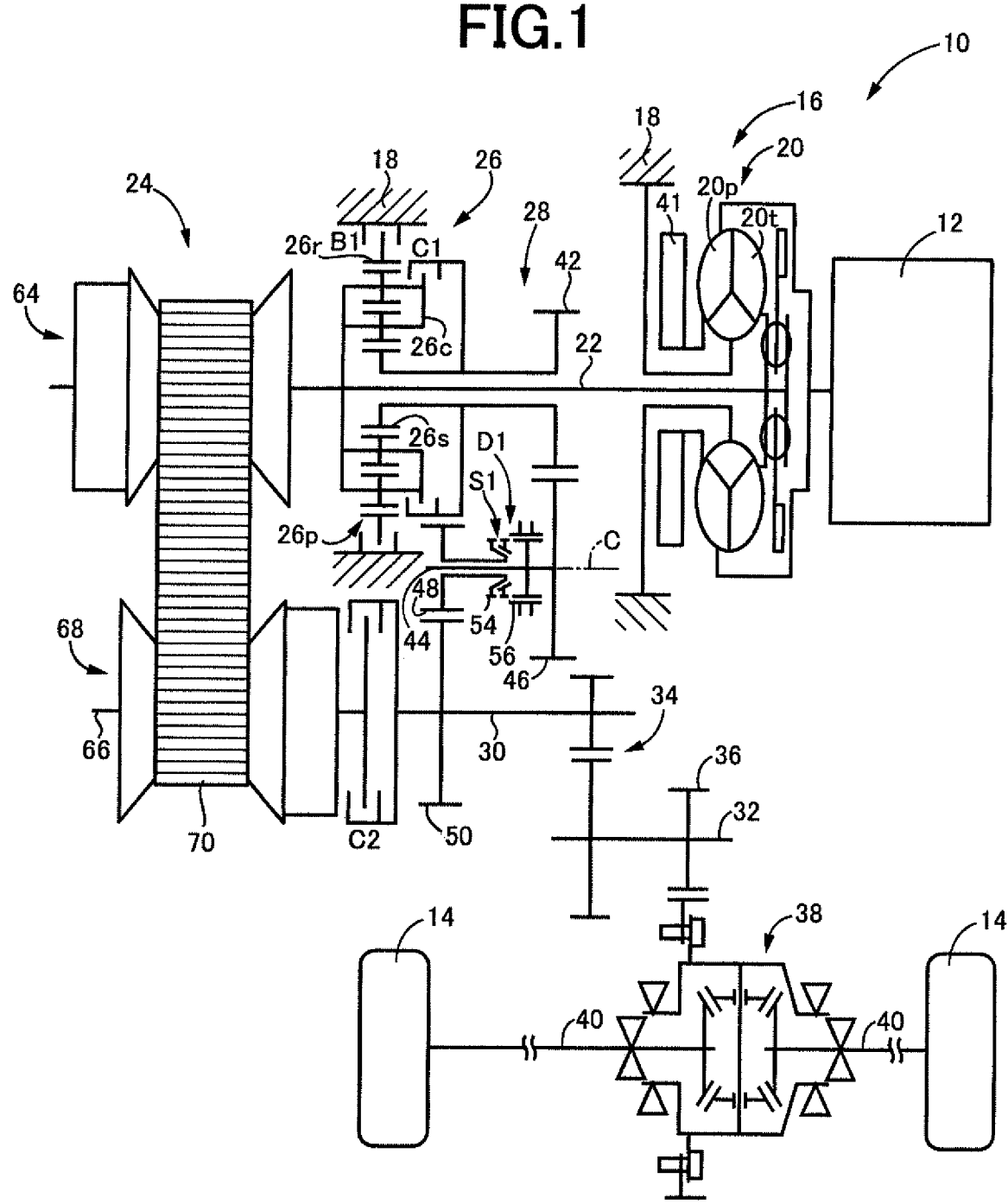

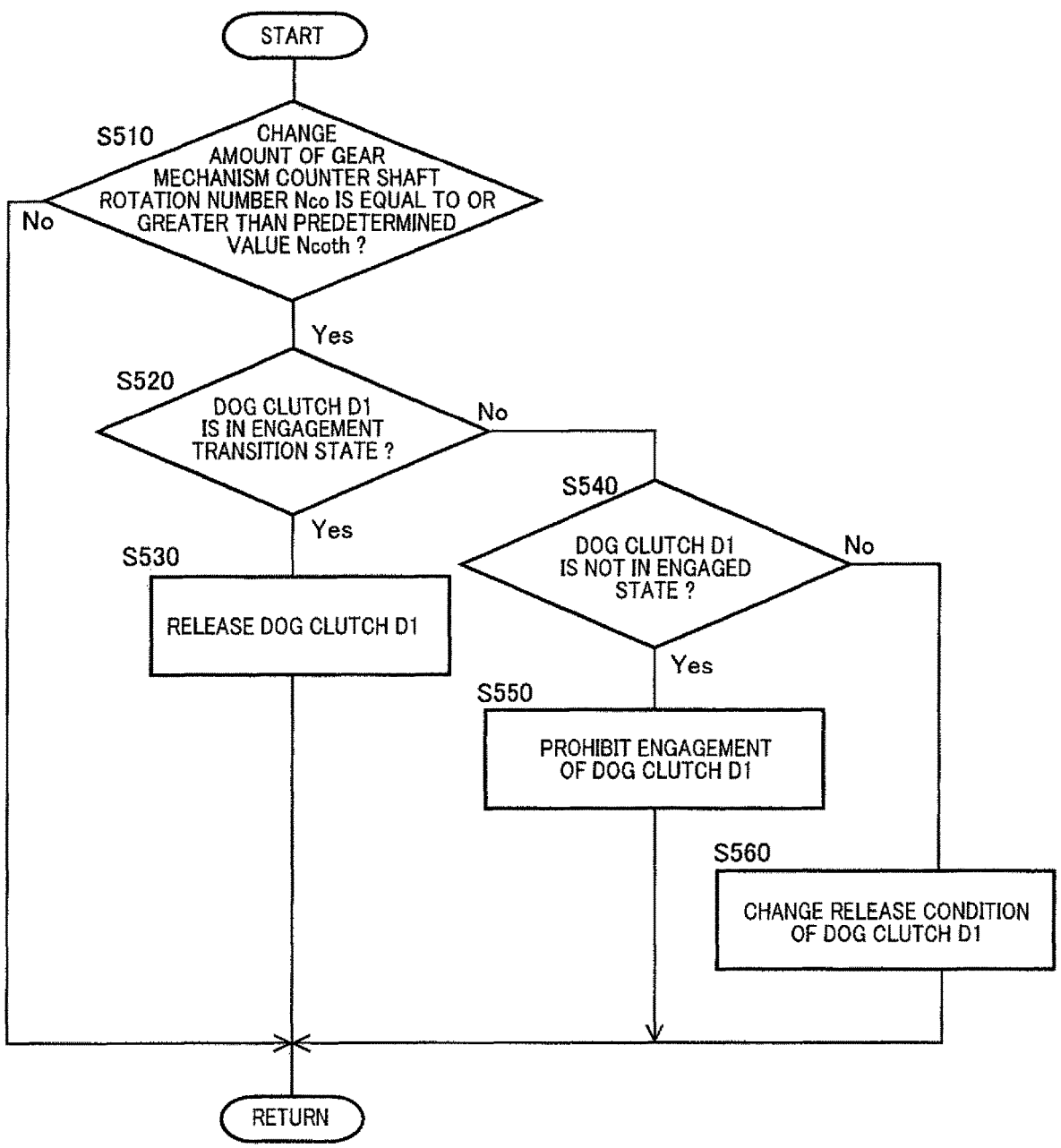

CONTROL DEVICE OF VEHICLE

This application claims priority from Japanese Patent Application No. 2018-038000 filed on Mar. 2, 2018, the disclosure of which is herein incorporated by reference in its entirety.

BACKGROUND OF THE INVENTION

Field of the Invention

The present invention relates to a control device of a vehicle and, more particularly, to a control device controlling a dog clutch based on a rotational speed change of an output rotating member.

Description of the Related Art

There is known a control device of a vehicle that includes a first power transmission path transmitting a power through a belt-type continuously variable transmission and a second power transmission path transmitting a power through a reduction gear mechanism in parallel between an input shaft and an output shaft and that includes a planetary gear-type forward/reverse switching device and a dog clutch in series in the second power transmission path. For example, this corresponds to a control device of a vehicle described in Patent Documents 1 and 2.

In the vehicle described in Patent Documents 1 and 2, during forward running of the vehicle in which a power is transmitted through the first power transmission path due to release of a first clutch and engagement of a second clutch, for example, when a vehicle speed becomes higher than a predetermined vehicle speed set in advance, the dog clutch is released. As a result, since transmission of rotation of the output shaft to the forward/reverse switching device is blocked, an influence of dragging of the first clutch is eliminated, which enables efficient transmission of the power of the vehicle.

PRIOR ART DOCUMENTS

Patent Documents

Patent Document 1: Japanese Laid-Open Patent Publication No. 2015-105708
Patent Document 2: WO 2014/170959

SUMMARY OF THE INVENTION

Technical Problem

In the vehicle described in Patent Documents 1 and 2, for example, when the vehicle is running on a rough road, rotation speed of the output shaft may abruptly be changed by an external force input to drive wheels of the vehicle. In this case, a differential rotation occurs abruptly between an input rotating member and an output rotating member of the dog clutch during engagement transition. Therefore, in the control device of the vehicle described in Patent Documents 1 and 2, for example, when a control of bringing the dog clutch into an engaged state from an engagement transition state is continued under a situation where the rotation speed of the output shaft abruptly changes, abnormal noise, i.e., so-called gear noise, may occur due to collision between meshing members of the dog clutch. This may make an occupant in the vehicle feel uncomfortable.

The present invention was conceived in view of the situations and it is therefore an object of the present invention to provide a control device of a vehicle configured to control a dog clutch based on a meshing state of the dog clutch when a rotational speed change of an output shaft becomes equal to or greater than a predetermined value.

Solution to Problem

To achieve the above object, a first aspect of the present invention provides a control device of a vehicle including a first power transmission path transmitting a power through a belt-type continuously variable transmission and a second power transmission path transmitting a power through a reduction gear mechanism in parallel between an input shaft and an output shaft and including a dog clutch in series with the reduction gear mechanism in the second power transmission path, wherein when the dog clutch is in an engagement transition state and a rotational speed change of the output shaft is equal to or greater than a predetermined value, the engagement transition state of the dog clutch is canceled to release the dog clutch.

A second aspect of the present invention provides the control device of a vehicle recited in the first aspect of the invention, wherein when the dog clutch is not in the engagement transition state and the rotational speed change of the output shaft is equal to or greater than the predetermined value, the engagement of the dog clutch is prohibited.

A third aspect of the present invention provides the control device of a vehicle recited in the first or second aspect of the invention, wherein when the dog clutch is in a released state and the rotational speed change of the output shaft is equal to or greater than the predetermined value, the engagement of the dog clutch is prohibited.

A fourth aspect of the present invention provides the control device of a vehicle recited in any one of the first to third aspects of the invention, wherein during running using the first power transmission path, a first release condition is used as a release condition to release the dog clutch, and wherein when the dog clutch is in an engaged state and the rotational speed change of the output shaft is equal to or greater than the predetermined value, the release condition of the dog clutch is changed to a second release condition with which the dog clutch is difficult to be released.

A fifth aspect of the present invention provides the control device of a vehicle recited in any one of the fourth aspect of the invention, wherein (a) the vehicle includes an engine and a forward/reverse switching device, wherein (b) the engine is coupled to a primary pulley of the belt-type continuously variable transmission through the input shaft, wherein (c) the forward/reverse switching device includes a carrier coupled to the input shaft and rotatably supporting at least a pair of pinions meshed with each other, a ring gear selectively coupled to a non-rotating member via a brake, and a sun gear coupled to the dog clutch, wherein (d) the vehicle includes a first clutch selectively coupling between the sun gear and the carrier and a second clutch selectively coupling between a secondary pulley of the belt-type continuously variable transmission and the output shaft, wherein (e) a power transmission for starting running is performed through the second power transmission path by releasing the second clutch and the brake and engaging the first clutch and the dog clutch; a power transmission for reverse running is performed through the second power transmission path by releasing the second clutch, engaging the brake, releasing the first clutch, and engaging the dog clutch; a power transmission for forward running at a speed lower than a predetermined vehicle speed is performed through the first power transmission path by engaging the second clutch, releasing the brake and the first clutch, and engaging the dog clutch; and a power transmission for forward running at a speed equal to or greater than the predetermined vehicle speed is performed through the first power transmission path by engaging the second clutch, releasing the brake, the first clutch, and the dog clutch, and wherein (f) the first release condition to release the dog clutch is that a vehicle speed becomes equal to or greater than the predetermined vehicle speed, while the second release condition is that the vehicle speed becomes equal to or greater than a vehicle speed set higher than the predetermined vehicle speed.

A sixth aspect of the present invention provides the control device of a vehicle recited in any one of the first to fifth aspects of the invention, wherein the dog clutch includes a pair of meshing members rotatable around a common axial center and having respective meshing teeth approaching in a direction of the axial center to mesh with each other, and a synchronizing ring disposed between the pair of meshing members, coming into contact with the meshing teeth of one meshing member of the pair of meshing members in a process in which the one meshing member is moved toward the other meshing member, and preventing passage of the one meshing member toward the other meshing member side until rotation is synchronized between the pair of meshing members, such that in an approach stroke of the one meshing member permitted to pass through the synchronizing ring to the other meshing member, relative rotation is permitted between the pair of meshing members.

A seventh aspect of the present invention provides the control device of a vehicle recited in the sixth aspect of the invention, wherein the engagement transition state is a state from a start of movement of the one meshing member toward the other meshing member to an end of the movement at which the one meshing member is meshed with the other meshing member.

Advantageous Effects of Invention

According to the control device of the vehicle recited in the first aspect of the invention, when the dog clutch is in the engagement transition state and the rotational speed change of the output shaft is equal to or greater than the predetermined value, the engagement transition state of the dog clutch is canceled to release the dog clutch. As a result, the control device can prevent the abnormal noise which is generated due to collision between the meshing members of the dog clutch and is generated by continuing the control of bringing the dog clutch into the engaged state.

According to the control device of the vehicle recited in the second aspect of the invention, when the dog clutch is not in the engagement transition state and the rotational speed change of the output shaft is equal to or greater than the predetermined value, the engagement of the dog clutch is prohibited. As a result, the control device can further prevent the abnormal noise which is generated due to collision between the meshing members of the dog clutch and is generated by engaging of the dog clutch.

According to the control device of the vehicle recited in the third aspect of the invention, when the dog clutch is in the released state and the rotational speed change of the output shaft is equal to or greater than the predetermined value, the engagement of the dog clutch is prohibited. As a result, the control device can further prevent the abnormal noise which is generated due to collision between the meshing members of the dog clutch and is generated by engaging of the dog clutch.

According to the control device of the vehicle recited in the fourth aspect of the invention, during running using the first power transmission path, the first release condition is used as the release condition to release the dog clutch, and when the dog clutch is in the engaged state and the rotational speed change of the output shaft is equal to or greater than the predetermined value, the release condition of the dog clutch is changed to the second release condition with which the dog clutch is difficult to be released. As a result, the vehicle is reduced in frequency of occurrence of the situation where the dog clutch cannot be brought into the engaged state due to the rotational speed change of the output shaft becoming equal to or greater than the predetermined value in the situation where it is desired to bring the dog clutch into the engaged state.

According to the control device of the vehicle recited in the fifth aspect of the invention, the vehicle includes the engine and the forward/reverse switching device, the engine is coupled to the primary pulley of the belt-type continuously variable transmission through the input shaft. The forward/reverse switching device includes the carrier coupled to the input shaft and rotatably supporting at least a pair of pinions meshed with each other, the ring gear selectively coupled to the non-rotating member via the brake, and the sun gear coupled to the dog clutch. The vehicle includes the first clutch selectively coupling between the sun gear and the carrier and the second clutch selectively coupling between the secondary pulley of the belt-type continuously variable transmission and the output shaft. In the vehicle, the power transmission for starting running is performed through the second power transmission path by releasing the second clutch and the brake and engaging the first clutch and the dog clutch. In the vehicle, the power transmission for reverse running is performed through the second power transmission path by releasing the second clutch, engaging the brake, releasing the first clutch, and engaging the dog clutch. In the vehicle, the power transmission for forward running at a speed lower than a predetermined vehicle speed is performed through the first power transmission path by engaging the second clutch, releasing the brake and the first clutch, and engaging the dog clutch. In the vehicle, the power transmission for forward running at a speed equal to or greater than the predetermined vehicle speed is performed through the first power transmission path by engaging the second clutch, releasing the brake, the first clutch, and the dog clutch. And, the first release condition to release the dog clutch is that the vehicle speed becomes equal to or greater than the predetermined vehicle speed, while the second release condition is that the vehicle speed becomes equal to or greater than the vehicle speed set higher than the predetermined vehicle speed. As a result, since the second release condition making the dog clutch difficult to be released is set in the vehicle, which further reduces the frequency of occurrence of the situation where the dog clutch cannot be brought into the engaged state due to the rotational speed change of the output shaft becoming equal to or greater than the predetermined value in a situation where it is desired to bring the dog clutch into the engaged state.

According to the control device of the vehicle recited in the sixth aspect of the invention, the dog clutch includes the pair of meshing members rotatable around the common axial center and having the respective meshing teeth approaching in the axial center direction to mesh with each other. The dog clutch includes the synchronizing ring disposed between the pair of meshing members, coming into contact with the meshing teeth of the one meshing member in the process in which the one meshing member is moved toward the other meshing member, and preventing passage of the one meshing member toward the other meshing member until rotation is synchronized between the pair of meshing members. In the approach stroke of the one meshing member permitted to pass through the synchronizing ring toward the other meshing member, relative rotation is permitted between the pair of meshing members. As a result, the pair of meshing members are smoothly meshed with each other.

According to the control device of the vehicle recited in the seventh aspect of the invention, the engagement transition state of the dog clutch is a state from the start of the movement of the one meshing member toward the other meshing member to the end of the movement at which the one meshing member is meshed with the other meshing member. The control device can control the state of the dog clutch based on the state of meshing between the pair of meshing members and therefore can reliably suppress the occurrence of the abnormal noise in the dog clutch when the rotational speed change of the output shaft is equal to or greater than the predetermined value.

BRIEF DESCRIPTION OF DRAWINGS

FIG. 1 is a schematic for explaining a general configuration of a vehicle to which the present invention is applied.

FIG. 2 is a diagram for explaining switching of running patterns by using an engagement table of engagement elements for each of the running patterns of the power transmission device included in the vehicle of FIG. 1.

FIG. 10 is a flowchart for explaining a main portion of the control operation of the electronic control device for controlling the dog clutch based on the rotational speed change of the output rotating member of the meshing clutch in a vehicle to which still another example of the present invention is applied.

MODES FOR CARRYING OUT THE INVENTION

Figure 3:
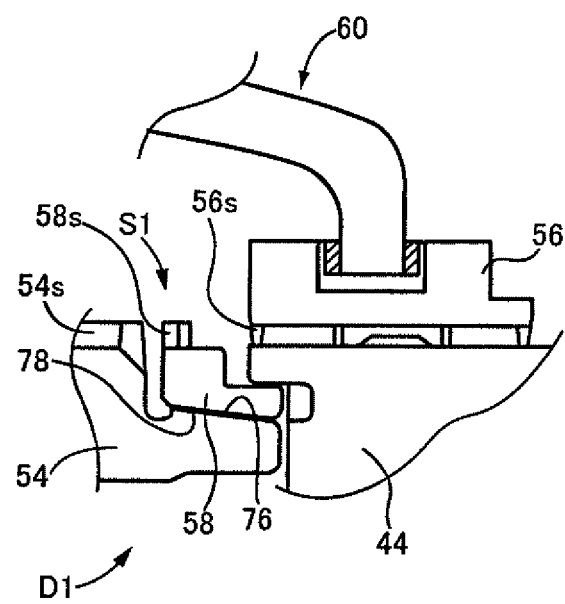
FIG. 3 is an enlarged view of a main portion of a rotation synchronizing mechanism disposed on the vehicle of FIG. 1.

An example of the present invention will now be described in detail with reference to the drawings. In the following example, the drawings are simplified or deformed as needed and portions are not necessarily precisely drawn in terms of dimension ratio, shape, etc.

Example 1

FIG. 1 is a schematic for explaining a general configuration of a vehicle to which the present invention is applied. In FIG. 1, the vehicle 10 includes an engine 12 functioning as a drive power source for running, drive wheels 14, and a vehicle power transmission device 16 disposed between the engine 12 and the drive wheels 14. The vehicle power transmission device 16 includes, in a housing 18 serving as a non-rotating member, a torque converter 20 as a hydraulic transmission device coupled to the engine 12, an input shaft 22 coupled to the torque converter 20, a known belt-type continuously variable transmission 24 (hereinafter referred to as a vehicle transmission 24) as a continuously variable transmission mechanism coupled to the input shaft 22, a forward/reverse switching device 26 also coupled to the input shaft 22, a gear mechanism 28 as a reduction gear mechanism coupled through the forward/reverse switching device 26 to the input shaft 22 and disposed parallel to the vehicle transmission 24. Further the vehicle power transmission device 16 includes an output shaft 30 common to the vehicle transmission 24 and the gear mechanism 28, a counter shaft 32, a reduction gear device 34 composed of a pair of gears meshing each other and, disposed on and non-rotatably relative to the output shaft 30 and the counter shaft 32, respectively, a differential gear 38 coupled to a gear 36 disposed relatively non-rotatably on the counter shaft 32, a pair of axles 40 coupled to the differential gear 38, etc. In the vehicle power transmission device 16 configured as described above, power of the engine 12 is transmitted sequentially through the torque converter 20, the vehicle transmission 24 or the forward/reverse switching device 26 and the gear mechanism 28, the reduction gear device 34, the differential gear 38, the axles 40, etc. to a pair of the drive wheels 14.

The vehicle power transmission device 16 includes a first power transmission path transmitting the power of the engine 12 from the input shaft 22 through the vehicle transmission 24 toward the drive wheels 14 i.e., to the output shaft 30 and a second power transmission path transmitting the power of the engine 12 from the input shaft 22 through the gear mechanism 28 toward the drive wheels 14 i.e., to the output shaft 30. The vehicle power transmission device 16 is configured such that the first power transmission path and the second power transmission path are switched depending on a running state of the vehicle 10. The second power transmission path has a larger transmission ratio than that of the first power transmission path, i.e., the second power transmission path is for lower speed relative to the first power transmission path. The vehicle power transmission device 16 includes a CVT running clutch C2 as a second clutch connecting/disconnecting the first power transmission path, a forward running clutch C1 as a first clutch connecting/disconnecting the second power transmission path, and a reverse running brake B1, as a clutch for selectively switching a power transmission path transmitting the power of the engine 12 toward the drive wheels 14 between the first power transmission path and the second power transmission path. The CVT running clutch C2, the forward running clutch C1, and the reverse running brake B1 correspond to a connecting/disconnecting device and they are known wet multiplate type hydraulic friction engagement devices, i.e., so-called friction clutches, frictionally engaged by hydraulic actuators. The forward running clutch C1 and the reverse running brake B1 are components which constitute the forward/reverse switching device 26.

The torque converter 20 is disposed concentrically with the input shaft 22 and around the input shaft 22 and includes a pump impeller 20p coupled to the engine 12 and a turbine impeller 20t coupled to the input shaft 22. The pump impeller 20p is coupled to a mechanically operated hydraulic oil pump 41 generating a hydraulic pressure used for control of supplying lubricating oil to portions of the power transmission path of the vehicle power transmission device 16, for example. The mechanically operated hydraulic oil pump 41 is operated in conjunction with rotation of the engine 12.

The forward/reverse switching device 26 is disposed concentrically with the input shaft 22 and around the input shaft 22 in the second power transmission path and includes a double pinion type planetary gear device 26p, the forward running clutch C1, and the reverse running brake B1. The planetary gear device 26p is a differential mechanism having three rotating elements, i.e., a carrier 26c as an input element which rotatably supports a pair of pinions meshed with each other, a sun gear 26s as an output element, and a ring gear 26r as a reaction force element. In the planetary gear device 26p, the carrier 26c is integrally coupled to the input shaft 22; the ring gear 26r is selectively coupled through the reverse running brake B1 to the housing 18; and the sun gear 26s is coupled to a small-diameter gear 42 disposed relatively rotatably around the input shaft 22 and coaxially with the input shaft 22. The carrier 26c and the sun gear 26s are selectively coupled through the forward running clutch C1. Therefore, the forward running clutch C1 is a clutch mechanism selectively coupling two of the three rotating elements, and the reverse running brake B1 is a clutch mechanism selectively coupling the reaction force element to the housing 18.

The gear mechanism 28 is a speed reduction mechanism including a small-diameter gear 42 and a large-diameter gear 46 meshed with the small-diameter gear 42. The large-diameter gear 46 is disposed on a gear mechanism counter shaft 44 relatively non-rotatably with respect to the axial center C of the gear mechanism counter shaft 44, while a rotating shaft 44, i.e., the gear mechanism counter shaft 44 is disposed rotatably around one axis, i.e., an axial center C. The gear mechanism 28 includes a transmission gear, i.e., an idler gear 48 disposed around the gear mechanism counter shaft 44 concentrically and relatively rotatably with respect to the gear mechanism counter shaft 44, and an output gear 50 disposed around the output shaft 30 concentrically and relatively non-rotatably with respect to the output shaft 30 and meshed with the idler gear 48. The output gear 50 has a larger diameter than the idler gear 48. Therefore, the gear mechanism 28 is a transmission mechanism having one gear ratio formed as a predetermined gear ratio in the power transmission path between the input shaft 22 and the output shaft 30.

The vehicle transmission 24 is disposed on the first power transmission path between the input shaft 22 and the output shaft 30. The vehicle transmission 24 includes a primary pulley 64 disposed on the input shaft 22, which is directly coupled to the engine 12, and having a variable effective diameter, a secondary pulley 68 disposed on a rotating shaft 66 coaxial with the output shaft 30 and having a variable effective diameter, and a transmission belt 70 wound between the paired pulleys 64, 68 and transmits power through a frictional force between the pair of the pulleys 64, 68 and the transmission belt 70. The vehicle transmission 24 has a transmission ratio (gear ratio) γ (=input shaft rotation speed Ni/output shaft rotation speed Nout) continuously changed by changing a V groove width of the pair of the pulleys 64, 68 to vary a winding diameter, i.e., effective diameter, of the transmission belt 70. The CVT running clutch C2 is disposed between the vehicle transmission 24 and the drive wheels 14, i.e., disposed between the secondary pulley 68 and the output shaft 30, to selectively connect/disconnect the secondary pulley 68, i.e., the rotating shaft 66, to/from the output shaft 30. In the vehicle power transmission device 16, the first power transmission path is established by engaging the CVT running clutch C2, and the power of the engine 12 is transmitted from the input shaft 22 via the vehicle transmission 24 to the output shaft 30. In the vehicle power transmission device 16, when the CVT running clutch C2 is released, the first power transmission path is put into a neutral state.

The dog clutch D1 with a synchromesh mechanism (hereinafter referred to as a dog clutch D1) is disposed around the gear mechanism counter shaft 44 and between the large-diameter gear 46 and the idler gear 48 to selectively connect/disconnect the large-diameter gear 46 to/from the idler gear 48 based on a shift operation. The dog clutch D1 is a dog clutch connecting/disconnecting the second power transmission path and acts as a third clutch disposed between the forward running clutch C1 and the output shaft 30 and connecting/disconnecting the second power transmission path. The second power transmission path is between the sun gear 26s and the output shaft 30.

FIG. 2 is a diagram for explaining switching of running patterns by using an engagement table of engagement elements for each of the running patterns of the power transmission device 16. Each column C1 in FIG. 2 denotes the operation state of the forward running clutch C1, each column C2 in FIG. 2 denotes the operation state of the CVT running clutch C2, each column B1 in FIG. 2 denotes the operation state of the reverse running brake B1, each column D1 in FIG. 2 denotes the operation state of the dog clutch D1, "○" indicative of connection, i.e., engagement, and "×" indicative of interruption, i.e., release.

In a gear running mode that is a running pattern in which the power of the engine 12 is transmitted through the reduction gear mechanism, i.e., the gear mechanism 28, to the output shaft 30, as shown in FIG. 2, for example, the forward clutch C1 and the dog clutch D1 are engaged, while the CVT running clutch C2 and the reverse brake B1 are released. In this gear running mode, for example, a power transmission is performed for a low vehicle speed region including starting state of running and a vehicle stop state through the second power transmission path. In this gear running mode, for example, when the reverse running brake B1 and the dog clutch D1 are engaged while the CVT running clutch C2 and the forward running clutch C1 are released, reverse running of the vehicle 10 is performed.

In a high-vehicle-speed CVT running mode that is a running pattern in which the power of the engine 12 is transmitted through the vehicle transmission 24 to the output shaft 30, as shown in FIG. 2, for example, the CVT running clutch C2 is engaged, while the forward running clutch C1, the reverse running brake B1, and the dog clutch D1 are released. In this high-vehicle-speed CVT running mode, for example, a power transmission is performed for forward running at a predetermined vehicle speed or more set in advance, i.e., high-vehicle-speed running, through the first power transmission path. The predetermined vehicle speed is a value previously obtained through experiments etc. and, for example, when a vehicle speed V becomes equal to or greater than the predetermined vehicle speed, switching is made to the high-vehicle-speed CVT running mode performed with the dog clutch D1 released. This prevents over-rotation of the pinions of the planetary gear device 26p and eliminates drag generated in the forward running clutch C1 etc., so that efficient running of the vehicle 10 can be achieved.

In the case of switching from the low-vehicle-speed gear running mode to the high-vehicle-speed CVT running mode, switching is transiently made from a state in which the forward running clutch C1 and the dog clutch D1 are engaged, which corresponds to the gear running mode, to a state in which the CVT running clutch C2 and the dog clutch D1 are engaged, for example, a medium-vehicle-speed CVT running mode. In the medium-vehicle-speed CVT running mode, for example, a power transmission is performed for forward running at a speed lower than the predetermined vehicle speed through the first power transmission path. In other words, when switching is made from the medium-vehicle-speed CVT running mode to the high-vehicle-speed CVT running mode, a release condition for release of the dog clutch D1, i.e., a first release condition of the dog clutch D1, is that the vehicle speed becomes equal to or greater than the predetermined vehicle speed.

In the case of switching from the high-vehicle-speed CVT running mode to the gear running mode at a speed lower than the predetermined vehicle speed, switching is made from a state in which the CVT running clutch C2 is engaged to a state in which the dog clutch D1 is further engaged, for example, the medium-vehicle-speed CVT running mode, for a preparation for switching to the gear running mode, temporary.

FIG. 3 is an enlarged view of a main portion of a rotation synchronizing mechanism, i.e., a synchromesh mechanism S1, disposed on the vehicle 10 of FIG. 1. The dog clutch D1 includes a gear piece 54 fixed to the idler gear 48. The gear piece 54 is provided to be fixedly disposed on the large-diameter gear 46 side of the idler gear 48 serving as an input rotating member and to be concentrically and relatively rotatable with respect to the gear mechanism counter shaft 44 serving as an output rotating member. In the dog clutch D1, outer circumferential teeth (not shown) formed on a portion of an outer circumferential surface of the gear mechanism counter shaft 44 are spline-fitted to inner circumferential teeth 56s on an inner circumferential surface of a sleeve 56 formed in an annular shape. The sleeve 56 is disposed relatively non-rotatably around the axial center C of the gear mechanism counter shaft 44 with respect to the gear mechanism counter shaft 44 and relatively movably in the axial center C direction with respect to the gear mechanism counter shaft 44.

In the dog clutch D1, the sleeve 56 and the gear piece 54 constitute a pair of meshing members having respective meshing teeth capable of meshing with each other. The inner circumferential teeth 56s of the sleeve 56 can mesh with outer circumferential teeth 54s of the gear piece 54 and correspond to the meshing teeth of one meshing member of the dog clutch D1 between the paired meshing members. The outer circumferential teeth 54s of the gear piece 54 correspond to the meshing teeth of the other meshing member of the dog clutch D1 between the paired meshing members.

The dog clutch D1 includes the synchromesh mechanism S1 serving as a rotation synchronizing mechanism having a synchronizing ring, i.e., a so-called synchronizer ring 58, synchronizing rotation speeds of the sleeve 56 and the gear piece 54 at the time of meshing therebetween. The synchronizer ring 58 constituting the synchromesh mechanism S1 is formed in an annular shape and disposed between the sleeve 56 and the gear piece 54. An outer circumferential surface of the synchronizer ring 58 is provided with outer circumferential teeth 58s engageable with the inner circumferential teeth 56s of the sleeve 56. The outer circumferential teeth 58s are formed in dimensions engageable with the inner circumferential teeth 56s when the sleeve 56 moves toward the gear piece 54 in the axial center C direction. An inner circumferential surface of the synchronizer ring 58 is provided with a tapered inner circumferential surface 78 coming into surface contact with a tapered outer circumferential surface 76 of the gear piece 54. The tapered inner circumferential surface 78 has an inner diameter decreasing as the surface 78 extends away from the gear piece 54 in the axial center C direction. The synchronizer ring 58 is relatively rotatably supported by the gear piece 54.

In the process in which the sleeve 56 is moved toward the gear piece 54, initially, the inner circumferential teeth 56s of the sleeve 56 first come into contact with the outer circumferential teeth 58s of the synchronizer ring 58 and are prevented from moving. When the synchronization of rotation speeds between the sleeve 56 and the gear piece 54 is completed, the inner circumferential teeth 56s of the sleeve 56 pass through the outer circumferential teeth 58s of the synchronizer ring 58 and mesh with the outer circumferential teeth 54s of the gear piece 54. As a result, rotation of the gear mechanism counter shaft 44 is transmitted through the dog clutch D1 to the idler gear 48. Therefore, in power transmission, the gear mechanism counter shaft 44 functions as a rotating member on the upstream side of the dog clutch D1, i.e., an input rotating member. In an approach stroke in which the sleeve 56 permitted to pass through toward the gear piece 54 by the synchronizer ring 58 approaches the gear piece 54, relative rotation is permitted between the sleeve 56 and the gear piece 54, and therefore, if a rotational speed change equal to or greater than a predetermined value Nth described later occurs in the output shaft 30, the synchronization between the sleeve 56 and the gear piece 54 is lost.

A shift fork 60 is fixed to a fork shaft (not shown) operated by an actuator not shown. The sleeve 56 is moved in a direction parallel to the axial center C via the shift fork 60 by the fork shaft.

FIG. 3 shows a state in which the inner circumferential teeth 56s of the sleeve 56 are not meshed with the outer circumferential teeth 58s of the synchronizer ring 58 and the outer circumferential teeth 54s of the gear piece 54, i.e., a released state of the dog clutch D1 with the sleeve 56 located at a neutral position. By moving the sleeve 56 located at the neutral position toward the gear piece 54 in the direction parallel to the axial center C to an engagement position for meshing with the gear piece 54, the dog clutch D1 is brought into an engaged state. While the sleeve 56 is at a transient position from the neutral position to the engagement position, i.e., while the sleeve 56 locates at from a start position of the movement to an end position of the movement, the dog clutch D1 is in an engagement transition state. The sleeve 56 meshes with the gear piece 54 at the end position of the movement.

Figure 4:
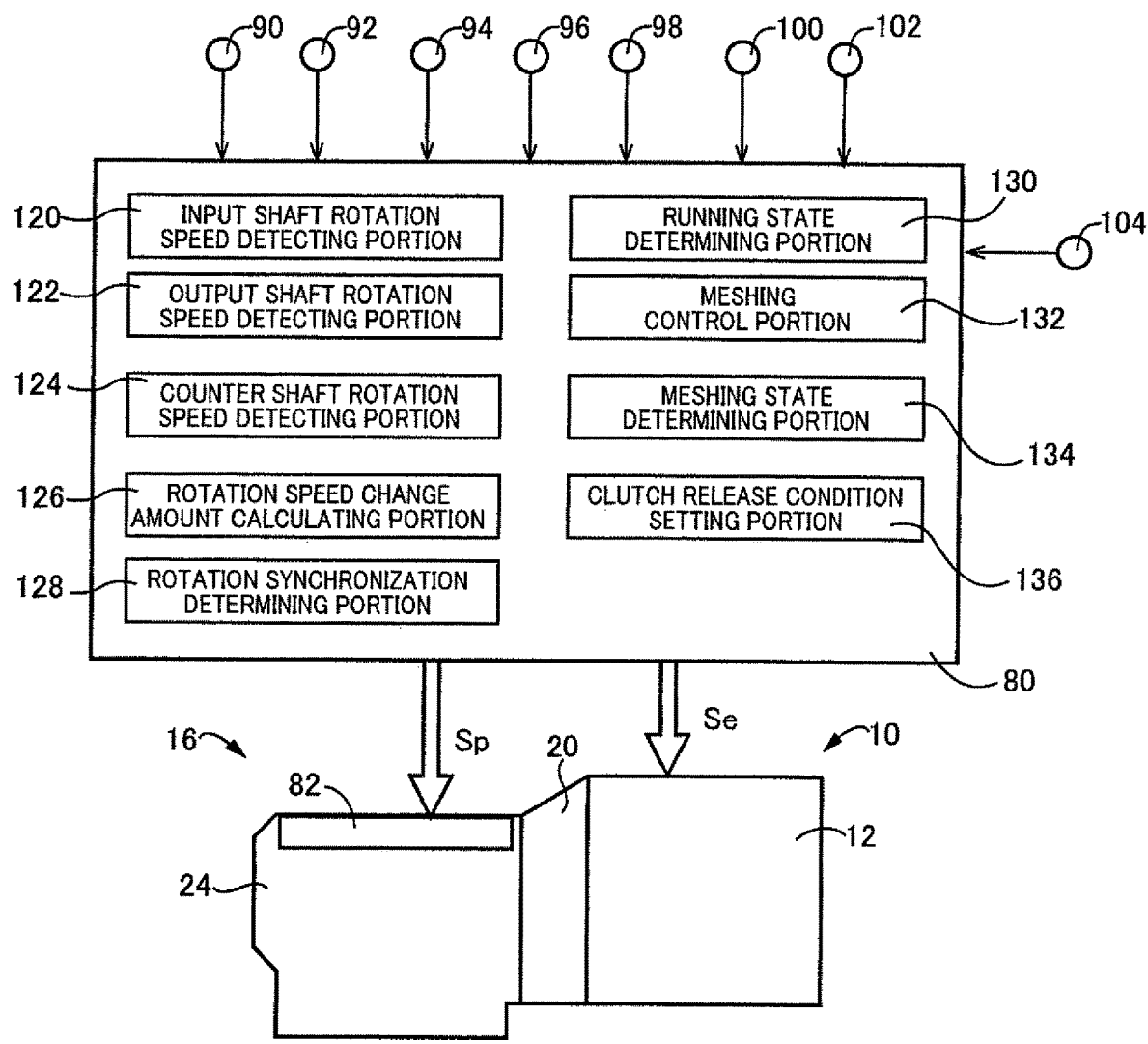
FIG. 4 is a diagram for explaining main portions of control system provided in the vehicle of FIG. 1.

FIG. 4 is a diagram for explaining a general configuration of the vehicle 10 to which the present invention is applied and is also a diagram for explaining main portions of control of the dog clutch D1 when the synchronization described above is lost in the vehicle 10. The vehicle 10 includes an electronic control device 80 controlling engagement and release of the dog clutch D1, for example. FIG. 4 is also a diagram showing an input/output system of the electronic control device 80 and is a functional block diagram for explaining main portions of a control function of the electronic control device 80. The electronic control device 80 is configured to include, for example, a so-called microcomputer including a CPU, a RAM, a ROM, an I/O interface, etc., and the CPU executes a signal process according to a program stored in advance in the ROM, while utilizing a temporary storage function of the RAM, to provide various controls of the vehicle 10.

The electronic control device 80 is supplied with various input signals detected by various sensors included in the vehicle 10. For example, the electronic control device 80 is supplied with each of an engine rotation speed Ne (rpm), the input shaft rotation speed Ni (rpm) that is a turbine rotation speed Nt (rpm), the output shaft rotation speed Nout (rpm) corresponding to the vehicle speed V (km), an accelerator opening degree θacc (%), a throttle valve opening degree θth (%), a gear mechanism counter shaft rotation speed Nco (rpm), a vehicle acceleration G (m/sec$^2$), a wheel rotation speed Nwh (rpm), etc. based on detection signals from an engine rotation speed sensor 90, an input shaft rotation speed sensor 92, an output shaft rotation speed sensor 94, an accelerator opening degree sensor 96, a throttle opening degree sensor 98, a counter shaft rotation speed sensor 100, an acceleration sensor 102, a wheel speed sensor 104, etc. The electronic control device 80 outputs each of an engine output control signal Se for output control of the engine 12, a hydraulic control command signal Sp for hydraulic control of the shift of the vehicle transmission 24, etc. The hydraulic control command signal Sp is an engagement command signal for engaging a predetermined friction clutch, for example, and an engagement command signal for actuating a solenoid valve (not shown) providing a regulating control of hydraulic pressures supplied to hydraulic actuators of friction clutches and is output to a hydraulic control circuit 82.

The electronic control device 80 shown in FIG. 4 includes, as the main portions of the control function, at least an input shaft rotation speed detecting means, i.e., an input shaft rotation speed detecting portion 120, an output shaft rotation speed detecting means, i.e., an output shaft rotation speed detecting portion 122, a counter shaft rotation speed detecting means, i.e., a counter shaft rotation speed detecting portion 124, a rotation speed change amount calculating means, i.e., a rotation speed change amount calculating portion 126, a rotation synchronization determining means, i.e., a rotation synchronization determining portion 128, a meshing control means, i.e., a meshing control portion 132, and a meshing state determining means, i.e., a meshing state determining portion 134. It is noted that the electronic control device 80 is shown to have a running state determining portion 130 and a clutch release condition setting portion 136, however, as described below, the running state determining portion 130 is used in Examples 2 and 3, and the clutch release condition setting portion 136 is used in Example 4, and thus the electronic control device 80 does not necessarily include the running state determining portion 130 and the clutch release condition setting portion 136 in Example 1, the clutch release condition setting portion 136 in Examples 2 and 3, the running state determining portion 130 in Example 4, and the rotation synchronization determining portion 128 in Examples 2, 3, 4

The input shaft rotation speed detecting portion 120 detects the input shaft rotation speed Ni of the input shaft 22 based on a signal output from the input shaft rotation speed sensor 92 included in the vehicle 10. The output shaft rotation speed detecting portion 122 detects the output shaft rotation speed Nout of the output shaft 30 based on a signal output from the output shaft rotation speed sensor 94 included in the vehicle 10. The counter shaft rotation speed detecting portion 124 detects the gear mechanism counter shaft rotation speed Nco of the gear mechanism counter shaft 44 based on a signal output from the counter shaft rotation speed sensor 100 included in the vehicle 10.

The rotation speed change amount calculating portion 126 calculates a change amount of the rotation speed Nout of the output shaft 30 based on the output shaft rotation speed Nout detected by the output shaft rotation speed detecting portion 122, for example. The rotation speed change amount calculating portion 126 calculates a change amount of the rotation speed Nco of the gear mechanism counter shaft 44 based on the gear mechanism counter shaft rotation speed Nco detected by the counter shaft rotation speed detecting portion 124. The change amounts of the output shaft rotation speed Nout and the gear mechanism counter shaft rotation speed Nco calculated by the rotation speed change amount calculating portion 126 are change amounts per predetermined time, for example, change amounts per unit time.

The rotation synchronization determining portion 128 determines whether the change amount of the output shaft rotation speed Nout calculated by the rotation speed change amount calculating portion 126 is equal to or greater than the predetermined value Nth set in advance. The predetermined value Nth is a value obtained in advance by experiments etc. such that for example, if the change amount of the output shaft rotation speed Nout is equal to or greater than the predetermined value Nth due to an abrupt change in the output shaft rotation speed Nout, a differential rotation occurs between the input shaft 22 and the output shaft 30, leading to a situation where a relative rotation may occur between the input shaft 22 and the output shaft 30, i.e., the synchronization may be lost in the dog clutch D1. Therefore, for example, if the dog clutch D1 is in the engagement transition state when the change amount of the output shaft rotation speed Nout is equal to or greater than the predetermined value Nth, abnormal noise, i.e., so-called gear noise, may occur in the dog clutch D1 due to collision between the inner circumference teeth 56s of the sleeve 56 and the outer circumferential teeth 54s of the gear piece 54 in the approach stroke of the sleeve 56 to the gear piece 54. The rotation synchronization determining portion 128 determines whether the change amount of the gear mechanism counter shaft rotation speed Nco calculated by the rotation speed change amount calculating portion 126 is equal to or greater than a predetermined value Ncoth set in advance which corresponds to the predetermined value Nth.

The meshing control portion 132 controls a meshing state of the dog clutch D1 to the engaged state or the released state based on whether the vehicle is in the medium-vehicle-speed CVT running mode or the high-vehicle-speed CVT running mode. For example, when the dog clutch D1 in the released state is changed to the engaged state, the meshing control portion 132 provides control to bring the sleeve 56 closer to the gear piece 54 in the direction parallel to the axial center C so that the sleeve 56 at the neutral position without meshing with each of the gear piece 54 and the synchronizer ring 58 is moved to the engagement position for meshing with the gear piece 54. When the dog clutch D1 in the engaged state is brought into the released state, the meshing control portion 132 provides control to move the sleeve 56 in the engagement position away from the gear piece 54 in the direction parallel to the axial center C to the neutral position.

For example, based on the positional relationship between the sleeve 56 and the gear piece 54 controlled by the meshing control portion 132, the meshing state determining portion 134 determines whether the meshing state of the dog clutch D1 is the engagement transition state. Specifically, when the meshing state of the dog clutch D1 is the engagement transition state, this means that the sleeve 56 is at a transient position between the neutral position and the engagement position, and the meshing state determining portion 134 determines whether the dog clutch D1 is in the engagement transition state based on an actuator thrust force for actuating the sleeve 56 detected by a thrust force sensor not shown, positional information of the sleeve 56 detected by a stroke sensor not shown of the sleeve 56, etc.

If the rotation synchronization determining portion 128 determines that the change amount of the output shaft rotation speed Nout is equal to or greater than the predetermined value Nth and the meshing state determining portion 134 determines that the dog clutch D1 is in the engagement transition state, the meshing control portion 132 controls the dog clutch D1 to the released state. Specifically, if it is determined that the change amount of the output shaft rotation speed Nout is equal to or greater than the predetermined value Nth and that the dog clutch D1 is in the engagement transition state, the meshing control portion 132 terminates the control of bringing the dog clutch D1 into the engaged state to cancel the engagement transition state of the dog clutch D1 and controls the dog clutch D1 to the released state. If the rotation synchronization determining portion 128 determines that the change amount of the output shaft rotation speed Nout is equal to or greater than the predetermined value Nth and the meshing state determining portion 134 determines that the dog clutch D1 is not in the engagement transition state, the meshing control portion 132 prohibits the engagement of the dog clutch D1. For example, if it is determined that the change amount of the output shaft rotation speed Nout is equal to or greater than the predetermined value Nth and that the dog clutch D1 is in a release transition state, i.e., the sleeve 56 is at a transient position from the engagement position to the neutral position, the dog clutch D1 is not in the engagement transition state, and therefore, the meshing control portion 132 brings the dog clutch D1 into the released state and then prohibits the control of bringing the dog clutch D1 into the engaged state.

Figure 5:
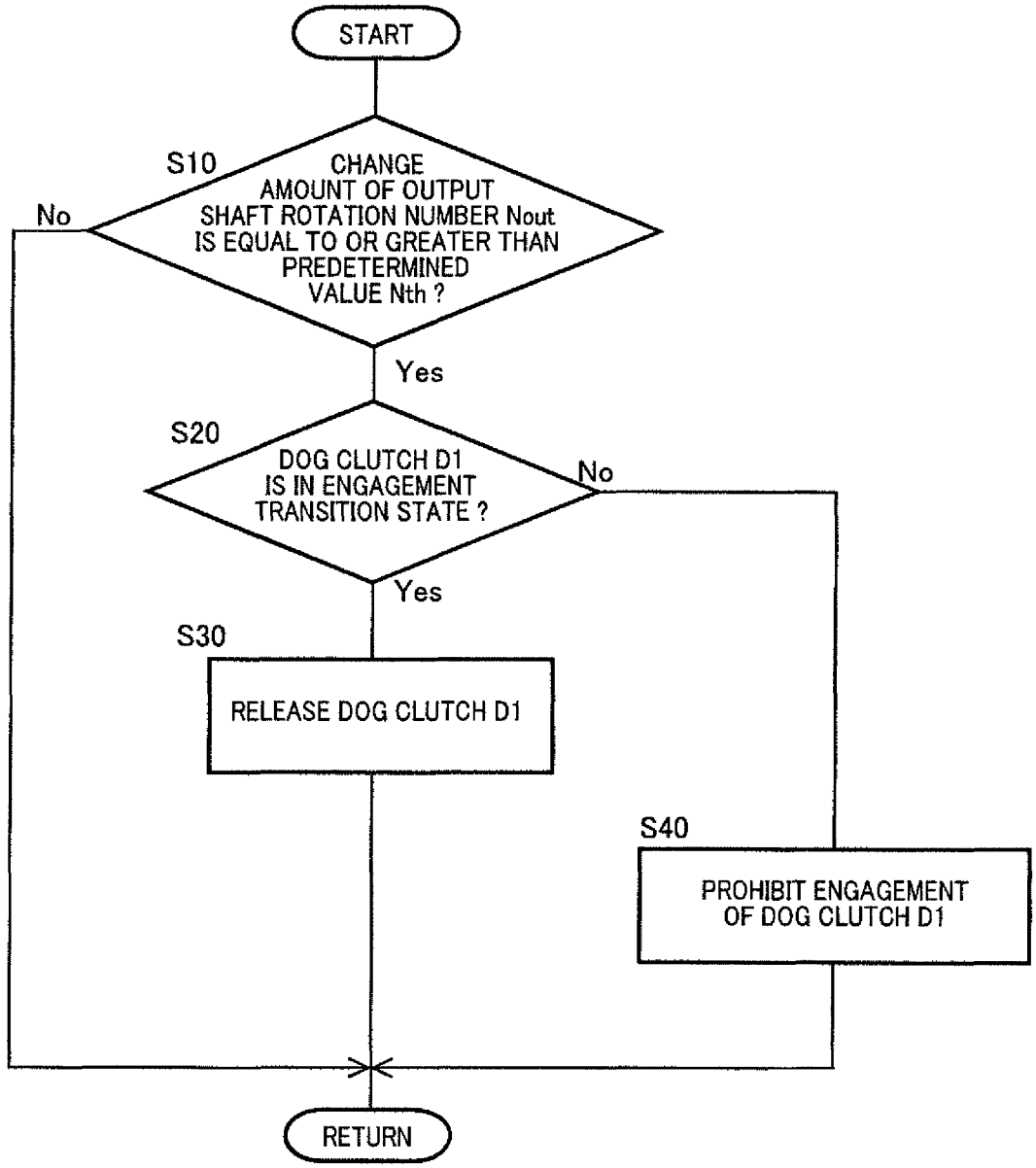
FIG. 5 is a flowchart for explaining a main portion of a control operation of an electronic control device for controlling a state of a dog clutch based on a rotational speed change of an output shaft in the vehicle of FIG. 1.

FIG. 5 is a flowchart for explaining a main portion of the control operation of the electronic control device 80 for controlling the dog clutch D1 based on the change amount of the rotation speed Nout of the output shaft 30 and is repeatedly executed.

At step S10 (hereinafter, step is omitted) corresponding to the rotation synchronization determining portion 128, it is determined whether the change amount of the rotation speed Nout of the output shaft 30 is equal to or greater than the predetermined value Nth. If the change amount of the output shaft rotation speed Nout is equal to or greater than the predetermined value Nth, S20 is executed. If the change amount of the output shaft rotation speed Nout is not equal to or greater than the predetermined value Nth, this routine is terminated.

At S20 corresponding to the meshing state determining portion 134, it is determined whether the dog clutch D1 is in the engagement transition state. If the dog clutch D1 is in the engagement transition state, S30 is executed. If the dog clutch D1 is not in the engagement transition state, S40 is executed.

At S30 corresponding to the meshing control portion 132, the control is provided to bring the dog clutch D1 into the released state. Subsequently, this routine is terminated. At S40 corresponding to the meshing control portion 132, the control is provided to prohibit the engagement of the dog clutch D1. Subsequently, this routine is terminated.

As described above, according to the control device 80 of the vehicle 10 of this example, when the dog clutch D1 is in the engagement transition state and the change amount of the rotation speed Nout of the output shaft 30 is equal to or greater than the predetermined value Nth, the engagement transition state of the dog clutch D1 is canceled to release the dog clutch D1. As a result, the control device 80 can prevent the abnormal noise which is generated due to collision between the meshing members of the dog clutch D1 and is generated by continuing the control of bringing the dog clutch D1 into the engaged state. Additionally, since the collision is avoided between the meshing members of the dog clutch D1, the control device 80 can suppress reduction in durability of the dog clutch D1.

According to the control device 80 of the vehicle 10 of this example, if the dog clutch D1 is not in the engagement transition state when the change amount of the rotation speed Nout of the output shaft 30 is equal to or greater than the predetermined value Nth, the engagement of the dog clutch D1 is prohibited. As a result, the control device 80 can further prevent the abnormal noise which is generated due to collision between the meshing members of the dog clutch D1 and is generated by engaging the dog clutch D1 when the change amount of the rotation speed Nout of the output shaft 30 is equal to or greater than the predetermined value Nth. Additionally, since the collision is avoided between the meshing members of the dog clutch D1 if the dog clutch D1 is not in the engagement transition state when the change amount of the output shaft rotation speed Nout is equal to or greater than the predetermined value Nth, the control device 80 can further suppress reduction in durability of the dog clutch D1.

According to the control device 80 of the vehicle 10 of this example, the dog clutch D1 includes the pair of meshing members, i.e., the sleeve 56 and the gear piece 54, disposed rotatably around the common axial center C and having the respective meshing teeth 56s and 54s approaching in the axial center C direction and meshing with each other. The dog clutch D1 includes the synchronizer ring 58 disposed between the sleeve 56 and the gear piece 54, coming into contact with the inner circumferential teeth 56s of the sleeve 56 in the process in which the sleeve 56 is moved toward the gear piece 54, and thereby preventing passage of the sleeve 56 toward the gear piece 54 until rotation is synchronized between the sleeve 56 and the gear piece 54. In the approach stroke of the sleeve 56 permitted to pass through by the synchronizer ring 58 toward the gear piece 54, relative rotation is permitted between the sleeve 56 and the gear piece 54. As a result, the sleeve 56 and the gear piece 54 are smoothly meshed with each other.

According to the control device 80 of the vehicle 10 of this example, the engagement transition state of the dog clutch D1 is a state from the start time point of the movement of the sleeve 56 toward the gear piece 54 to the end time point of the movement when the sleeve 56 is meshed with the gear piece 54. The control device 80 can control the state of the dog clutch D1 based on the state of meshing between the sleeve 56 and the gear piece 54 and therefore can reliably suppress the occurrence of the abnormal noise in the dog clutch D1 when the change amount of the output shaft rotation speed Nout is equal to or greater than the predetermined value Nth.

Example 2

Another example of the present invention will be described. The same portions as Example 1 described above will be denoted by the same reference numerals and will not be described.

An electronic control device 80 in this example functionally includes a running state determining means, i.e., the running state determining portion 130, instead of the rotation synchronization determining portion 128 included in the electronic control device 80 of the example described above. The running state determining portion 130 determines whether the vehicle 10 is in a running state corresponding to the case that the change amount of the output shaft rotation speed Nout is equal to or greater than the predetermined value Nth. Based on the output shaft rotation speed Nout detected by the output shaft rotation speed sensor 94, the running state determining portion 130 determines whether the vehicle 10 is running on a rough road on which the output shaft rotation speed Nout abruptly changes due to an external force input to the drive wheels 14, for example. Based on the wheel rotation speed Nwh, the vehicle acceleration G detected by the acceleration sensor 102, etc., the running state determining portion 130 determines whether the vehicle 10 is running on a slippery road surface, i.e., a low μ road having a small friction coefficient μ on which the change amount of the output shaft rotation speed Nout of the output shaft 30 becomes equal to or greater than the predetermined value Nth.

The electronic control device 80 of this example operates differently from the example described above in the following points. Specifically, if the running state determining portion 130 determines that the vehicle 10 is running on a rough road, i.e., a low μ road on which the change amount of the output shaft rotation speed Nout becomes equal to or greater than the predetermined value Nth and the meshing state determining portion 134 determines that the dog clutch D1 is in the engagement transition state, the meshing control portion 132 controls the dog clutch D1 to the released state. If the running state determining portion 130 determines that the vehicle 10 is running on the rough road, i.e., the low μ road, and the meshing state determining portion 134 determines that the dog clutch D1 is not in the engagement transition state, the meshing control portion 132 prohibits the engagement of the dog clutch D1.

Figure 6:
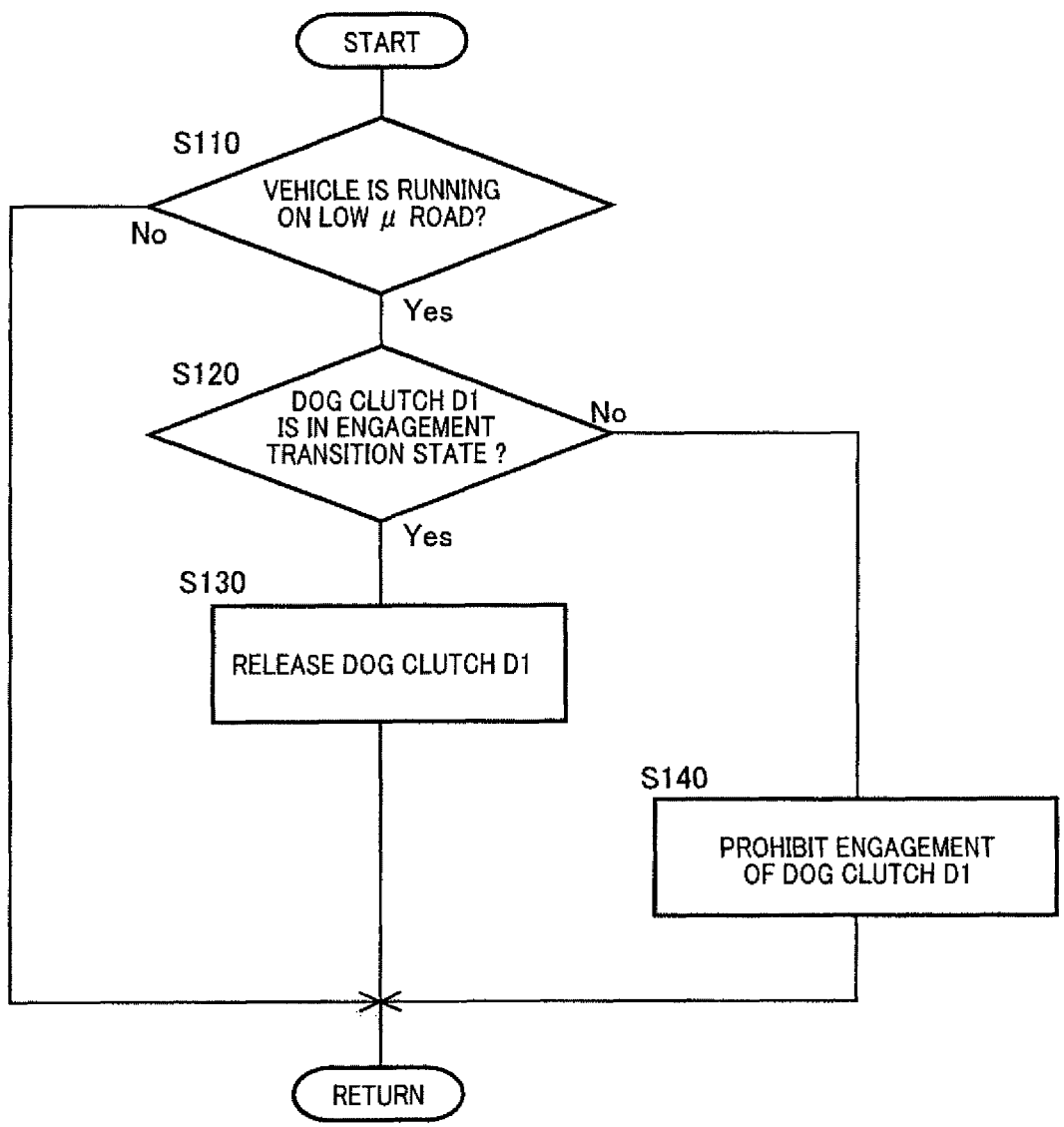
FIG. 6 is a flowchart for explaining a main portion of the control operation of the electronic control device for controlling the dog clutch based on a running state of a vehicle to which another example of the present invention is applied.

FIG. 6 is a flowchart for explaining a main portion of the control operation of the electric control device 80 for controlling the dog clutch D1 based on the running state of the vehicle 10 and is repeatedly executed.

At S110 corresponding to the running state determining portion 130, it is determined whether the vehicle 10 is running on a low μ road on which the change amount of the rotation speed Nout of the output shaft 30 becomes equal to or greater than the predetermined value Nth. If the vehicle 10 is running on the low μ road, S120 is executed. If the vehicle 10 is not running on the low μ road, this routine is terminated.

At S120 corresponding to the meshing state determining portion 134, it is determined whether the dog clutch D1 is in the engagement transition state. If the dog clutch D1 is in the engagement transition state, S130 is executed. If the dog clutch D1 is not in the engagement transition state, S140 is executed.

At S130 corresponding to the meshing control portion 132, the control is provided to bring the dog clutch D1 into the released state. Subsequently, this routine is terminated. At S140 corresponding to the meshing control portion 132, the control is provided to prohibit the engagement of the dog clutch D1. Subsequently, this routine is terminated.

As described above, according to the control device 80 of the vehicle 10 of this example, if the dog clutch D1 is in the engagement transition state when the vehicle 10 is running on a low μ road on which the change amount of the rotation speed Nout of the output shaft 30 becomes equal to or greater than the predetermined value Nth, the engagement transition state of the dog clutch D1 is canceled to release the dog clutch D1. As a result, the control device 80 can prevent the abnormal noise which is generated due to collision between the meshing members of the dog clutch D1 and is generated by continuing the engagement of the dog clutch D1. Additionally, since the collision is avoided between the meshing members of the dog clutch D1, the control device 80 can suppress reduction in durability of the dog clutch D1.

According to the control device 80 of the vehicle 10 of this example, if the dog clutch D1 is not in the engagement transition state when the vehicle 10 is running on the low μ road, the engagement of the dog clutch D1 is prohibited. As a result, the control device 80 can further prevent the abnormal noise which is generated due to collision between the meshing members of the dog clutch D1 and is generated by engaging the dog clutch D1 when the vehicle 10 is running on the low μ road. Additionally, since the collision is avoided between the meshing members of the dog clutch D1 if the dog clutch D1 is not in the engagement transition state when the vehicle 10 is running on the low μ road, the control device 80 can further suppress reduction in durability of the dog clutch D1.

Example 3

As of the electronic control device 80 of Example 2, an electronic control device 80 of the present example functionally includes the running state determining means, i.e., the running state determining portion 130, instead of the rotation synchronization determining portion 128; however, the function thereof is different from that of Example 2. Specifically, based on the wheel rotation speed Nwh detected by the wheel speed sensor 104, the vehicle speed V and the output shaft rotation speed Nout detected by the output shaft rotation speed sensor 94, etc., the running state determining portion 130 of this example determines whether the vehicle 10 is in a tire slip state i.e. a slip state of the drive wheels 14 in which braking force of the drive wheels 14 is not sufficiently exerted and the change amount of the output shaft rotation speed Nout becomes equal to or greater than the predetermined value Nth due to an abrupt change in the output shaft rotation speed Nout when the braking force is sufficiently exerted, for example. In other words, the running state determining portion 130 determines whether the vehicle 10 is running on a low μ road, based on the determination on whether the vehicle 10 is in the tire slip state. Furthermore, the running state determining portion 130 may make the determination on whether the vehicle 10 is running on a low μ road in accordance with, for example, whether an anti-lock brake system (ABS) (not shown) controlling the slipping drive wheels 14 to exert an optimum braking force is operating, based on the wheel rotation speeds Nwh detected by the wheel speed sensors 104 disposed on the respective drive wheels 14. The running state determining portion 130 also determines the running state of the vehicle 10 when the change amount of the rotation speed Nco of the gear mechanism counter shaft 44 becomes equal to or greater than the predetermined value Ncoth.

The electronic control device 80 of this example operates differently from the examples described above in the following points. Specifically, if the running state determining portion 130 determines that the vehicle 10 is in the tire slip state and the meshing state determining portion 134 determines that the dog clutch D1 is in the engagement transition state, the meshing control portion 132 controls the dog clutch D1 to the released state. If the running state determining portion 130 determines that the vehicle 10 is in the tire slip state and the meshing state determining portion 134 determines that the dog clutch D1 is not in the engagement transition state, the meshing control portion 132 prohibits the engagement of the dog clutch D1.

Figure 7:
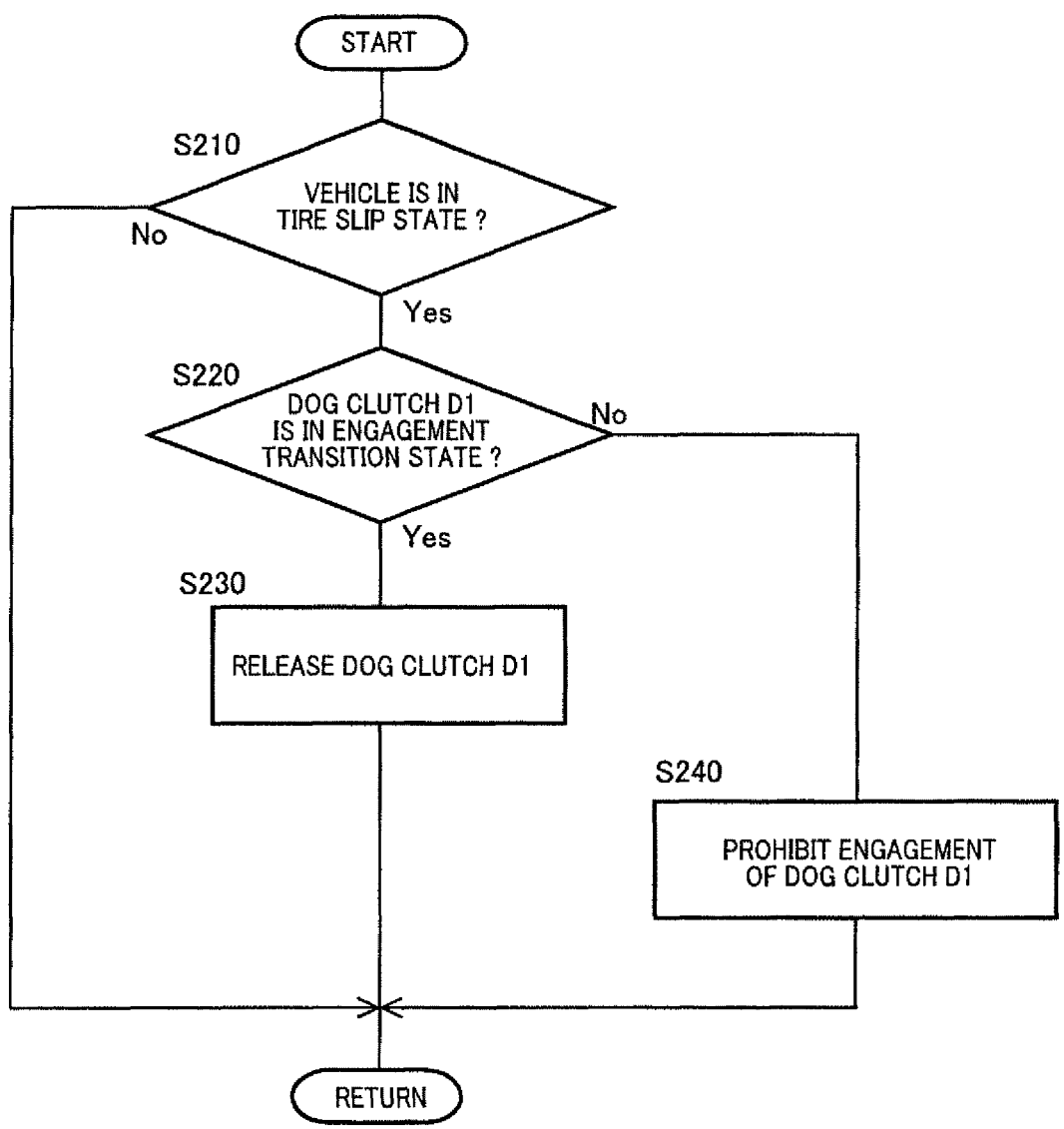
FIG. 7 is a flowchart for explaining a main portion of the control operation of the electronic control device for controlling the dog clutch based on a running state of a vehicle to which still another example of the present invention is applied.

FIG. 7 is a flowchart for explaining a main portion of the control operation of the electronic control device 80 for controlling the dog clutch D1 based on the running state of the vehicle 10 and is repeatedly executed.

At S210 corresponding to the running state determining portion 130, it is determined whether the vehicle 10 is in the tire slip state. If the vehicle 10 is in the tire slip state, S220 is executed. If the vehicle 10 is not in the tire slip state, this routine is terminated.

At S220 corresponding to the meshing state determining portion 134, it is determined whether the dog clutch D1 is in the engagement transition state. If the dog clutch D1 is in the engagement transition state, S230 is executed. If the dog clutch D1 is not in the engagement transition state, S240 is executed.

At S230 corresponding to the meshing control portion 132, the control is provided to bring the dog clutch D1 into the released state. Subsequently, this routine is terminated. At S240 corresponding to the meshing control portion 132, the control is provided to prohibit the engagement of the dog clutch D1. Subsequently, this routine is terminated.

As described above, according to the control device 80 of the vehicle 10 of this example, if the dog clutch D1 is in the engagement transition state when the vehicle 10 is in the tire slip state, the engagement transition state of the dog clutch D1 is canceled to release the dog clutch D1. As a result, the control device 80 can prevent the abnormal noise which is generated due to collision between the meshing members of the dog clutch D1 and is generated by continuing the engagement of the dog clutch D1 when the braking force of the drive wheels 14 is not sufficiently exerted, for example. Additionally, since the collision is avoided between the meshing members of the dog clutch D1, the control device 80 can suppress reduction in durability of the dog clutch D1.

According to the control device 80 of the vehicle 10 of this example, if the dog clutch D1 is not in the engagement transition state when the vehicle 10 is in the tire slip state, the engagement of the dog clutch D1 is prohibited. As a result, the control device 80 can further prevent the abnormal noise which is generated due to collision between the meshing members of the dog clutch D1 and is generated by engaging the dog clutch D1 when the vehicle 10 is in the tire slip state. Additionally, since the collision is avoided between the meshing members of the dog clutch D1 if the dog clutch D1 is not in the engagement transition state when the vehicle 10 is in the tire slip state, the control device 80 can further suppress reduction in durability of the dog clutch D1.

Example 4

An electronic control device 80 of this example functionally includes a clutch release condition setting means, i.e., the clutch release condition setting portion 136, in addition to the functions of the electronic control device 80 of Example 1. The clutch release condition setting portion 136 sets a release condition for releasing the dog clutch D1 being in the engaged state from the first release condition to a second release condition. This second release condition has a vehicle speed set to the higher vehicle speed side than the first release condition and is a condition for releasing the dog clutch D1 at a vehicle speed V set higher than the predetermined vehicle speed. Therefore, the second release condition makes the clutch D1 more difficult to be released than the first release condition, and when the second release condition is set, the dog clutch D1 is in the engaged state in more situations as compared to when the first release condition is set.

More specifically, the clutch release condition setting portion 136 sets the second release condition by changing the first release condition of the dog clutch D1 set in advance based on the vehicle speed V, for example. Specifically, if the rotation synchronization determining portion 128 determines that the change amount of the output shaft rotation speed Nout is equal to or greater than the predetermined value Nth and the meshing state determining portion 134 determines that the dog clutch D1 is not in the engagement transition state and that the dog clutch D1 is not in the released state or the release transition state, i.e., if the dog clutch D1 is in the engaged state, the clutch release condition setting portion 136 changes the release condition of the dog clutch D1 from the first release condition to the second release condition.

Figure 8:
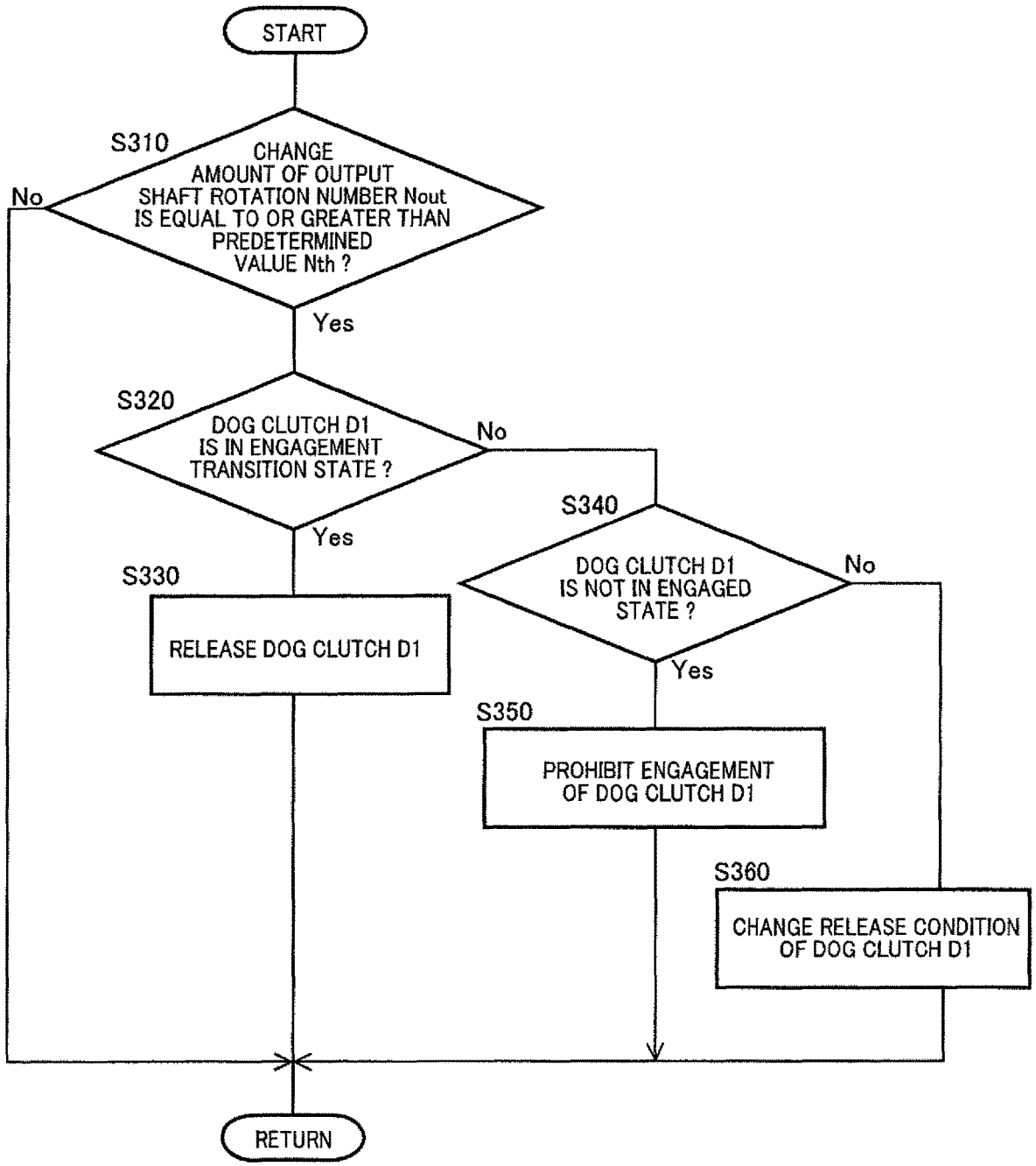
FIG. 8 is a flowchart for explaining a main portion of the control operation of the electronic control device for controlling the dog clutch based on the rotational speed change of the output shaft in a vehicle to which still another example of the present invention is applied.

FIG. 8 is a flowchart for explaining a main portion of the control operation of the electronic control device 80 for controlling the dog clutch D1 based on the running state of the vehicle 10 and is repeatedly executed.

At S310 corresponding to the rotation synchronization determining portion 128, it is determined whether the change amount of the rotation speed Nout of the output shaft 30 is equal to or greater than the predetermined value Nth. If the change amount of the output shaft rotation speed Nout is equal to or greater than the predetermined value Nth, S320 is executed. If the change amount of the output shaft rotation speed Nout is not equal to or greater than the predetermined value Nth, this routine is terminated.

At S320 corresponding to the meshing state determining portion 134, it is determined whether the dog clutch D1 is in the engagement transition state. If the dog clutch D1 is in the engagement transition state, S330 is executed. If the dog clutch D1 is not in the engagement transition state, S340 is executed.

At S330 corresponding to the meshing control portion 132, the control is provided to bring the dog clutch D1 into the released state. Subsequently, this routine is terminated.

At S340 corresponding to the meshing state determining portion 134, it is determined whether the dog clutch D1 is not in the engaged state. If the dog clutch D1 is not in the engaged state, i.e., is in either the released state or the release transition state, S350 is executed. If the dog clutch D1 is in the engaged state, S360 is executed.

At S350 corresponding to the meshing control portion 132, the control is provided to prohibit the engagement of the dog clutch D1. Subsequently, this routine is terminated. At S360 corresponding to the clutch release condition setting portion 136, the control is provided to change the release condition of the dog clutch D1 to the second release condition. Subsequently, this routine is terminated.

As described above, according to the control device 80 of the vehicle 10 of this example, if the change amount of the output shaft rotation speed Nout becomes equal to or greater than the predetermined value Nth and the dog clutch D1 is not in the engagement transition state and is not in the released state or the release transition state, i.e., the dog clutch D1 is in the engaged state, the release condition of the dog clutch D1 is changed to the second release condition which is satisfied when the vehicle speed V is on the higher vehicle speed side than that in the first release condition and in which the dog clutch D1 becomes difficult to be released. As a result, the vehicle 10 is reduced in frequency of occurrence of the situation where the dog clutch D1 cannot be brought into the engaged state due to the change amount of the output shaft rotation speed Nout becoming equal to or greater than the predetermined value Nth in the situation where it is desired to bring the dog clutch D1 into the engaged state. Therefore, the power is efficiently transmitted in the vehicle 10, so that the power performance of the vehicle 10 can be improved.

According to the control device 80 of the vehicle 10 of this example, if the change amount of the output shaft rotation speed Nout becomes equal to or greater than the predetermined value Nth and the dog clutch D1 is not in the engagement transition state and is in the released state or the release transition state, the engagement of the dog clutch D1 is prohibited. As a result, the control device 80 can further prevent the abnormal noise which is generated due to collision between the meshing members of the dog clutch D1 and is generated by engaging the dog clutch D1.

Although the preferred examples of the present invention have been described in detail with reference to the drawings, the present invention is not limited thereto and is implemented in other forms.

For example, in the examples described above, the control device 80 of the vehicle 10 controls the dog clutch D1 based on the meshing state of the dog clutch D1 when the change amount of the output shaft rotation speed Nout of the output shaft 30 is equal to or greater than the predetermined value Nth; however, the present invention is not necessarily limited thereto. For example, the control device 80 of the vehicle 10 may control the dog clutch D1 based on the meshing state of the dog clutch D1 when the change amount of the shaft rotation speed Nco of the gear mechanism counter shaft 44 rotating together with the output shaft 30 and equivalent to the rotation speed Nout of the output shaft 30 or a change amount of the wheel rotation speed Nwh of the drive wheels 14 is equal to or greater than a determination value corresponding to the predetermined value Nth. The dog clutch D1 may not necessarily include the synchromesh mechanism S1. Even in this case, a certain effect is acquired.

In the examples described above, in the control device 80 of the vehicle 10, the running state determining portion 130 determines the running state of the vehicle 10 when the change amount of the output shaft rotation speed Nout is equal to or greater than the predetermined value Nth; however, the present invention is not necessarily limited thereto. For example, the running state determining portion 130 may determine the running state of the vehicle 10 when the change amount of the gear mechanism counter shaft rotation speed Nco or the change amount of the wheel rotation speed Nwh of the drive wheels 14 is equal to or greater than the determination value corresponding to the predetermined value Nth.

Figure 9:
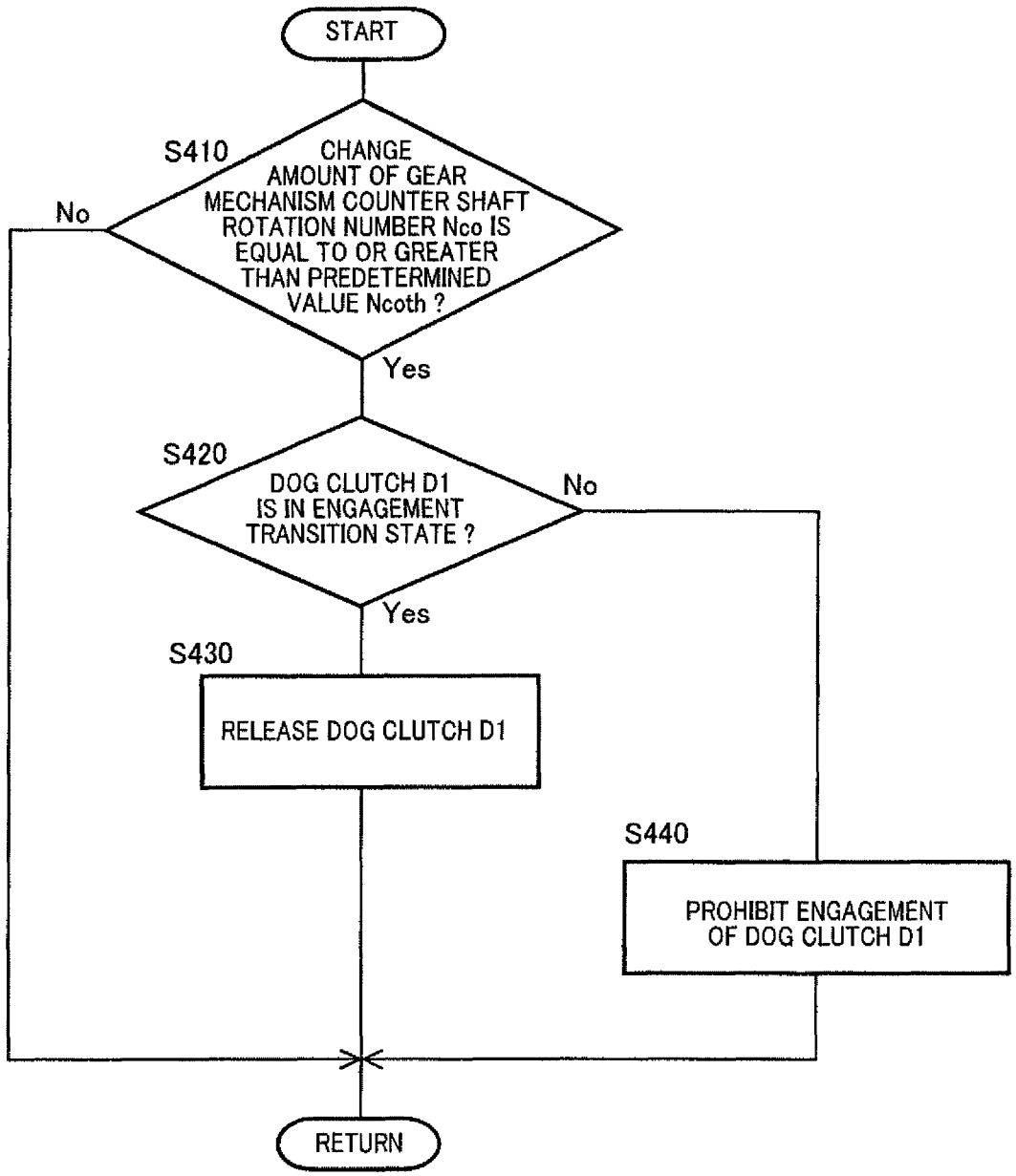
FIG. 9 is a flowchart for explaining a main portion of the control operation of the electronic control device for controlling the dog clutch based on the rotational speed change of an output rotating member of the meshing clutch in a vehicle to which still another example of the present invention is applied.

FIGS. 9 and 10 are flowcharts for explaining a main portion of the control operation of the electronic control device 80 for controlling the dog clutch D1 based on the change amount of the rotation speed Nco of the gear mechanism counter shaft 44 and are repeatedly executed. FIG. 9 shows a flowchart of another example corresponding to FIG. 5 of Example 1. FIG. 10 shows a flowchart of another example corresponding to FIG. 8 of Example 4. Specifically, at S410 of FIG. 9 and S510 of FIG. 10 corresponding to the rotation synchronization determining portion 128, it is determined whether the change amount of the gear mechanism counter shaft rotation speed Nco is equal to or greater than the predetermined value Ncoth, instead of the change amount of the output shaft rotation speed Nout. If the change amount of the gear mechanism counter shaft rotation speed Nco is equal to or greater than the predetermined value Ncoth, S420 and S520 are executed respectively. If the change amount of the gear mechanism counter shaft rotation speed Nco is not equal to or greater than the predetermined value Ncoth, this routine is terminated. After S420, the same control as the control after S20 of Example 1 is executed. After S520, the same control as the control after S320 of Example 4 is executed.

As a result, according to the control device 80 of the vehicle 10 of the examples shown in FIGS. 9 and 10, if the dog clutch D1 is in the engagement transition state when the change amount of the gear mechanism counter shaft rotation speed Nco is equal to or greater than the predetermined value Ncoth, the engagement transition state of the dog clutch D1 is canceled to release the dog clutch D1. Therefore, the control device 80 can prevent the abnormal noise which is generated due to collision between the meshing members of the dog clutch D1 and is generated by continuing the engagement of the dog clutch D1. Additionally, since the collision is avoided between the meshing members of the dog clutch D1, the control device 80 can suppress reduction in durability of the dog clutch D1.

As in Examples 2 and 3, the control device 80 of the vehicle 10 according to the examples shown in FIGS. 9 and 10 may control the dog clutch D1 if the running state determining portion 130 determines that the change amount of the gear mechanism counter shaft rotation speed Nco is equal to or greater than the predetermined value Ncoth, for example, that the vehicle 10 is running on the low μ road or in the tire slipping state, and the meshing state determining portion 134 determines that the dog clutch D1 is in the engagement transition state.

In Examples 1 to 4, the electronic control device 80 functionally includes the rotation synchronization determining portion 128 or the running state determining portion 130 as a main portion of the control function; however, the present invention is not necessarily limited thereto. The electronic control device 80 may include both the portions 128 and 130 to determine whether the change amount of the output shaft rotation speed Nout or the gear mechanism counter shaft rotation speed Nco is equal to or greater than the predetermined value Nth or Ncoth set in advance and to determine the running state of the vehicle 10 when the change amount of the output shaft rotation speed Nout or the gear mechanism counter shaft rotation speed Nco is equal to or greater than the predetermined value Nth or Ncoth, and the determination on whether the dog clutch D1 is in the engagement transition state may be made by the meshing state determining portion 134 if both of these determinations are affirmative, or the above-described determination may be made by the meshing state determining portion 134 if at least one of the determinations is affirmative.

Although the examples of the present invention have been described in detail with reference to the drawings, the above description is merely an embodiment, and although not exemplarily illustrated one by one, the present invention can be implemented in variously modified and improved forms based on the knowledge of those skilled in the art without departing from the spirit thereof.

REFERENCE SIGNS LIST

10: vehicle
12: engine
18: housing (non-rotating member)
22: input shaft
24: belt-type continuously variable transmission
26: forward/reverse switching device
26p: planetary gear device (pinion)
26c: carrier
26r: ring gear
26s: sun gear
30: output shaft
44: gear mechanism counter shaft
54: gear piece (meshing member)
54s: outer circumferential teeth (meshing teeth)
56: sleeve (meshing member)
56s: inner circumferential teeth (meshing teeth)
58: synchronizer ring (synchronizing ring)
64: primary pulley
68: secondary pulley
80: electronic control device (control device)
B1: reverse running brake (brake)
C1: forward running clutch (first clutch)
C2: CVT running clutch (second clutch)
D1: dog clutch (dog clutch with a synchromesh mechanism)
C: axial center

What is claimed is:

1. A control device of a vehicle including a first power transmission path transmitting power through a belt-type continuously variable transmission and a second power transmission path transmitting power through a reduction gear mechanism in parallel with the belt-type continuously variable transmission between an input shaft and an output shaft and including a dog clutch in series with the reduction gear mechanism in the second power transmission path, wherein
when the dog clutch is in an engagement transition state and a rotational speed change of the output shaft is equal to or greater than a predetermined value, the engagement transition state of the dog clutch is canceled to release the dog clutch.

2. The control device of a vehicle according to claim 1, wherein
when the dog clutch is not in the engagement transition state and the rotational speed change of the output shaft is equal to or greater than the predetermined value, the engagement of the dog clutch is prohibited.

3. The control device of a vehicle according to claim 1, wherein
when the dog clutch is in a released state and the rotational speed change of the output shaft is equal to or greater than the predetermined value, the engagement of the dog clutch is prohibited.

4. The control device of a vehicle according to claim 1, wherein
during running using the first power transmission path, a first release condition is used as a release condition to release the dog clutch, and wherein
when the dog clutch is in an engaged state and the rotational speed change of the output shaft is equal to or greater than the predetermined value, the release condition of the dog clutch is changed to a second release condition with which the dog clutch is more difficult to be released than with the first release condition.

5. The control device of a vehicle according to claim 4, wherein
the vehicle includes an engine and a forward/reverse switching device, wherein
the engine is coupled to a primary pulley of the belt-type continuously variable transmission through the input shaft, wherein
the forward/reverse switching device includes a carrier coupled to the input shaft and rotatably supporting at least a pair of pinions meshed with each other, a ring gear selectively coupled to a non-rotating member via a brake, and a sun gear coupled to the dog clutch, wherein
the vehicle includes a first clutch selectively coupling between the sun gear and the carrier and a second clutch selectively coupling between a secondary pulley of the belt-type continuously variable transmission and the output shaft, wherein
power transmission for starting running is performed through the second power transmission path by releasing the second clutch and the brake and engaging the first clutch and the dog clutch; power transmission for reverse running is performed through the second power transmission path by releasing the second clutch, engaging the brake, releasing the first clutch, and engaging the dog clutch; power transmission for forward running at a speed lower than a predetermined vehicle speed is performed through the first power transmission path by engaging the second clutch, releasing the brake and the first clutch, and engaging the dog clutch; and power transmission for forward running at a speed equal to or greater than the predetermined vehicle speed is performed through the first power transmission path by engaging the second clutch, releasing the brake, the first clutch, and the dog clutch, and wherein
the first release condition to release the dog clutch is that a vehicle speed becomes equal to or greater than the predetermined vehicle speed, while the second release condition is that the vehicle speed becomes equal to or greater than a vehicle speed set higher than the predetermined vehicle speed.

6. The control device of a vehicle according to claim 1, wherein
the dog clutch includes a pair of meshing members rotatable around a common axial center and having respective meshing teeth approaching in a direction of the axial center to mesh with each other, and a synchronizing ring disposed between the pair of meshing members, coming into contact with the meshing teeth of one meshing member of the pair of meshing members in a process in which the one meshing member is moved toward the other meshing member, and preventing passage of the one meshing member toward the other meshing member side until rotation is synchronized between the pair of meshing members, such that in an approach stroke of the one meshing member permitted to pass through the synchronizing ring to the other meshing member, relative rotation is permitted between the pair of meshing members.

7. The control device of a vehicle according to claim 6, wherein the engagement transition state is a state from a start of movement of the one meshing member toward the other meshing member to an end of the movement at which the one meshing member is meshed with the other meshing member.

* * * * *